April 28, 1931.  A. E. YOUNG  1,802,963
MEASURING APPARATUS
Filed Feb. 16, 1929   2 Sheets-Sheet 1
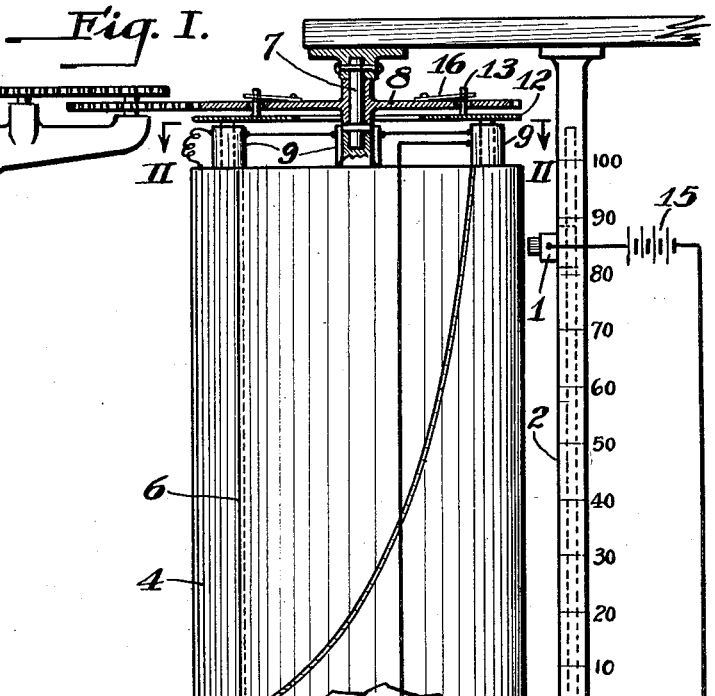
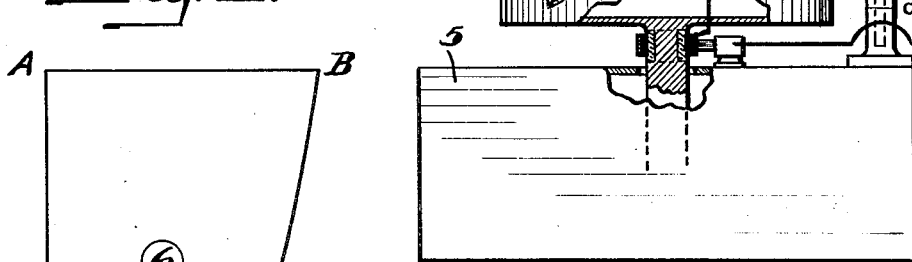
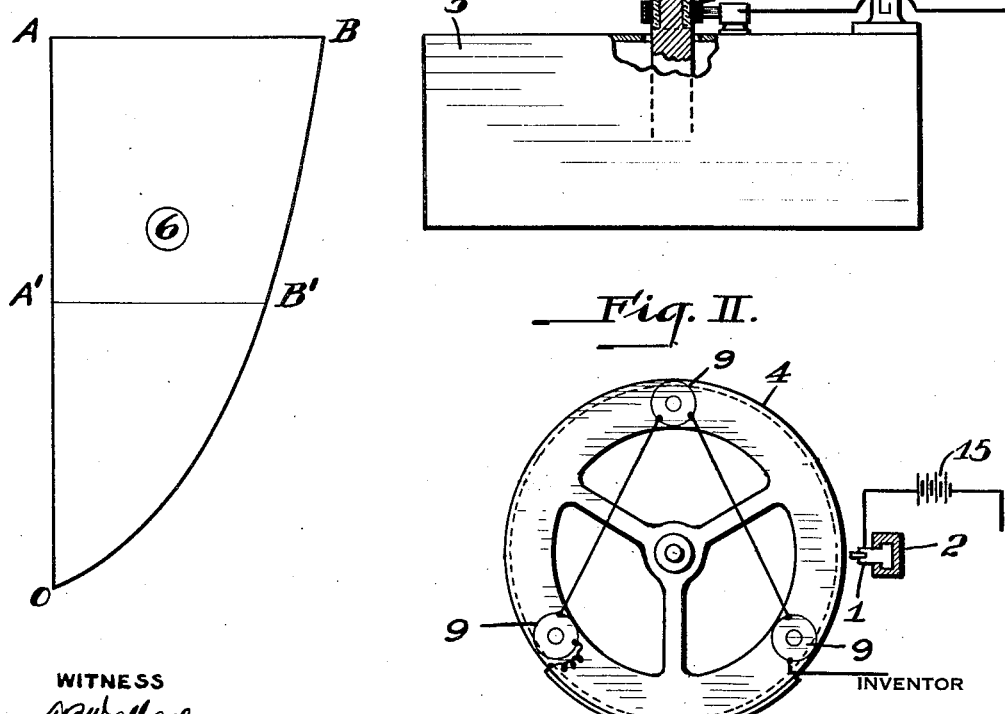
WITNESS
A B Wallace
INVENTOR
Archer E. Young
by Christy & Christy
his attorneys April 28, 1931. A. E. YOUNG 1,802,963
MEASURING APPARATUS
Filed Feb. 16, 1929 2 Sheets-Sheet 2
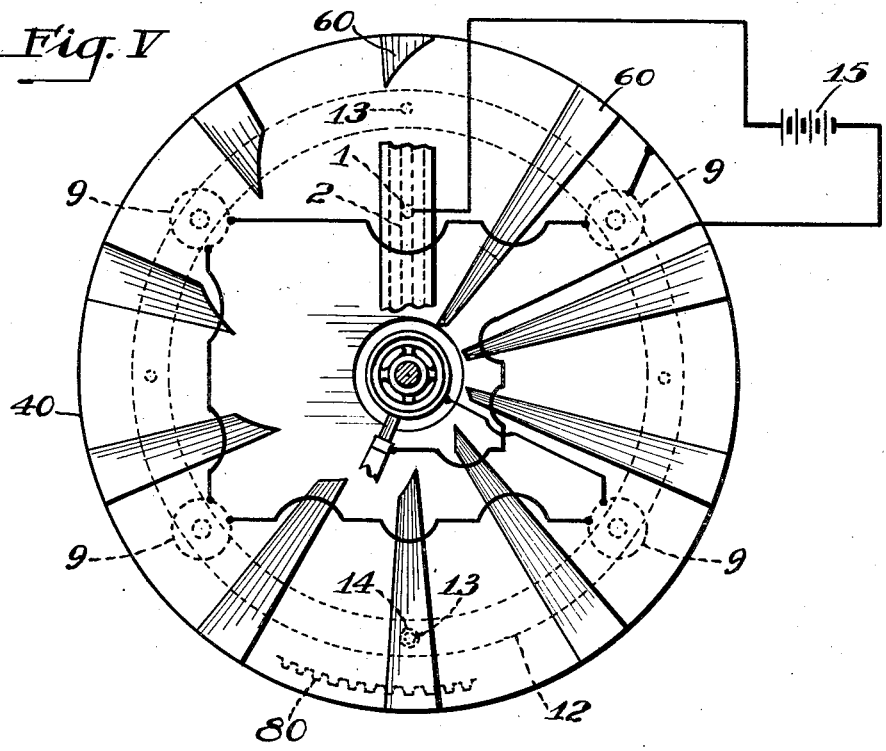
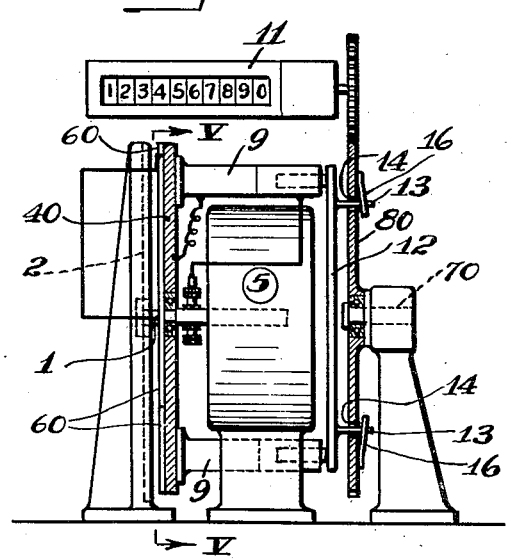
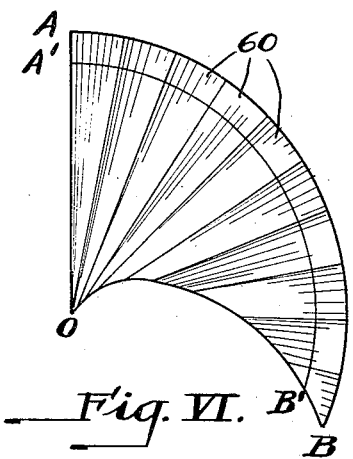
WITNESS INVENTOR Patented Apr. 28, 1931

1,802,963

UNITED STATES PATENT OFFICE

ARCHER E. YOUNG, OF PITTSBURGH, PENNSYLVANIA

MEASURING APPARATUS

Application filed February 16, 1929. Serial No. 340,500.

My invention relates to measuring apparatus and consists in means for effecting summation of any desired function of a variable quantity during successive and predetermined intervals of time. The invention finds practical application in the measurement of liquid flowing in a conductor, and in such application I shall, by way of example, describe it. The wider applicability of the invention will then be indicated.

In the accompanying drawings Fig. I is a view partly in elevation and partly in vertical section of a liquid meter, a meter for measuring the flow of petroleum, for example, in a pipe line, in which the invention is embodied and employed. Fig. II is a view in plan from above of certain of the cooperating parts of the structure of Fig. I. Fig. III is a diagram, illustrative of the invention as it is embodied in Fig. I. Fig. IV is a view in vertical and axial section of a liquid meter in which with modification of detail the invention is embodied and employed. Fig. V is a view to larger scale and in vertical section of the meter of Fig. IV, and on a plane at right angles to that of Fig. IV, the plane being indicated at V—V, Fig. IV. Fig. VI is a view of like character with Fig. III, and serves to illustrate more fully the invention as it is embodied in Figs. IV and V.

Referring first to Figs. I and II, 1 is a block movable along a guideway 2. The block in its movement along the guideway may be understood to be responsive to variation in the rate of flow of petroleum through an orifice arranged in the line of flow. A graduated scale set opposite the guideway may afford in concrete figures the actual pressure differential for any and every position of block 1.

A cylindrical shell 4, formed essentially of electrically insulating material, is rotatably mounted upon an axis parallel with guideway 2, and the guideway extends in suitable proximity to the shell. While the guideway with its block might be arranged within the shell, it preferably is arranged externally, as it here is shown. Conveniently the guideway 2 is arranged to extend vertically, and, correspondingly, the cylinder stands in vertical position. The cylinder is constantly rotated by clockwork 5.

The cylinder carries upon its surface a contact area, conveniently in the form of an applied plate 6 of brass or other conducting material. This applied plate is included in a circuit with a source 15 of electric energy. The plate preferably rises somewhat above the general surface of the cylinder. The arrangement is such that, as the cylinder rotates, the block 1 (which, to this end, will conveniently be equipped with a contact brush) makes intermittent contact with this conducting area, thus completing and breaking an electrical circuit.

In Fig. III the applied plate 6 of Fig. I is shown, projected in a single plane. It is the plate 6 unrolled, so to say, and extending in a plane. In this particular instance the shape and area are such as to afford, in the organized apparatus, the summation through recurrent intervals of time of the square root of a variable. The edge A—O of the plate extends, when assembled in the organized apparatus, in parallelism with the guideway 2 in which the block 1 moves; the edge A B extends circumferentially of the cylinder—that is to say, in an arc parallel to that which when the cylinder is rotating the block 1 in any constant position along its guideway would traverse upon the surface of the cylinder; the edge B—O of the plate 6 is such that, as the block 1 rises from O (the zero point) toward the point A, the distance A'—B' will always equal the square root of the distance O—A'. When no liquid is flowing the block 1, it will be understood, stands opposite the point O of plate 6. As, in response to flow, block 1 rises, and as the cylinder 4 rotates, the block will during each rotation make contact with the plate during an increasing interval of time, and always the period of contact will be proportioned to the square root of the distance at which the block stands above the zero point.

An independently rotatable shaft 7 is mounted axially above the cylinder 4. This shaft 7 carries integrally a gear wheel 8. The gear wheel 8, which normally stands at rest, is intermittently connected to the clockdriven cylinder 4, so as to rotate in unison with the cylinder; and the contact plate 6 upon the cylinder 4, in its described cooperation with the block 1, constitutes the means for determining the period of intermittent rotation of shaft 7 and gear wheel 8.

A magnetic clutch intermittently units the gear wheel 8 with the cylinder 4. The clutch includes electro-magnets 9, conveniently three in number, mounted upon cylinder 4, and a ring 12 of soft iron, movable in axial direction with respect to the cylinder. Throughout its range of movement ring 12 engages gear wheel 8 by means of pins 13 which extend through orifices in the gear wheel. Springs 16 may be provided, tending always to sustain ring 12 in elevated position, free of contact with the cores of the electro-magnets 9. And so long as the ring 12 is thus sustained, the gear wheel 8 will continue at rest, while the cylinder 6 continually rotates beneath. When the electro-magnets 9 are energized, the ring 12 is drawn against the tension of the sustaining springs to contact with the cores of the magnets, and being so drawn and held to such contact, the gear wheel 8 rotates in unison with the cylinder. When the magnets are deenergized, immediately the released ring 12 is by spring tension raised free of contact with the cores of the electro-magnets, and the gear wheel 8 comes to rest.

The electro-magnets 9 are arranged in series in that circuit alluded to above, in which the source of energy 15 and the plate 6 are included. The wiring is such, as clearly appears in Figs. I and II, that throughout all the range of rotation the plate 6 is in electric communication with the source of electric energy and that when the brush with which block 1 is equipped makes electric contact with the plate 6, the circuit is closed through the electro-magnets 9. The circuit is closed when and only when the block 1 makes contact with plate 6. When this contact is broken, the current fails, and the energizing of the electro-magnets ceases.

The gear wheel 8 is the initial member of a train of gears which constitutes a tally meter 11. The tally, it will be perceived, will indicate the aggregate length of the varying line A' B' (Fig. II) of contact of block 1 with the plate 6 as the cylinder rotates. The tally thus gives summation through a given interval of time of quantities which vary as the square root of the distance at which the block 1 stands above zero. And, inasmuch as the volume of a body of liquid varies as the square root of the pressure differential, the tally driven by the means described may, by proper proportioning of parts, be caused to afford direct reading of the volume which in the time interval of operation passes through the pipe line.

The plate 6 stands preferably slightly above the surface of cylinder 4 elsewhere, to the end that during the portion of cylinder revolution when the circuit is broken, block 1 may stand free of contact with the cylinder and free of any drag which such contact might otherwise impose on the response of the block in its movement along its guideway 2, to changing conditions in the flowing stream of petroleum.

Turning to Figs. IV, V, and VI, an instrument involving essentially the same principle of operation as the instrument of Fig. I is shown and illustrated. It differs, however, in certain details.

The block 1 moves in a guideway, as in the case first described. In place of a cylinder, a disk 40 of insulating material is provided, which by means of clockwork 5 is constantly rotated. The guideway in which the block 1 moves is parallel to the face of the disk. Conveniently these parts stand in the vertical position shown. Upon the face of the disk 40 strips 60 of conducting material are laid. These strips 60 preferably stand slightly above the face of the disk. The strips 60 are connected in series in a circuit which includes a source 15 of electric energy. The strips are essentially of sector shape, truncated at their inner ends; they extend inward from the periphery of the disk toward the center; they may be equally spaced, as shown, circumferentially of the disk; and the truncation at their inner ends is on a curve. The aggregate area of the strips is indicated in Fig. VI. A plate 60 adapted to the circular form of the carrier 40, and in such adaptation possessing the characteristic already described of plate 6 of Figs. I and III, is in this instance cut into strips by cuts which with respect to the peripheral arc A—B of the plate are radial. Similarly, as in the case already described, the block in the assembled apparatus moves from zero, at the point O radially toward the periphery A—B; the edge O—A is radial; the edge A—B circumferential; and in every position of block 1 the arc A'—B', which defines the traveling contact of block with the plate, is the desired function of the distance O—A'. The illustration is in this respect diagrammatic, and is not to be understood to be mathematically plotted. It may be assumed that in a particular case the edge O—B of the plate is so shaped and proportioned that in every position of the block from O to A the fraction of a total circumference which the block 1 traces while in contact with plate 60 is proportional to the square root of the distance O—A'. The expedient of cutting the plate 60 to segments and applying these at spaced intervals around the disk 40, increasing the actual number of contacts, reduces their duration, and so leaves block 1 freely responsive at more frequent intervals to changing conditions in the main. Otherwise, the effect of the making and breaking of contact between block and plate is the same as that described in connection with the instrument of Fig. I.

Similarly as in the instrument of Fig. I a gear wheel 80 is borne upon an axle 70 aligned with the axle of disk 40. This gear wheel is the first of the train which composes the tally 11. Between disk 40 and gear wheel 80 is arranged a magnetic clutch consisting of the same parts, operating to the same ends. The disk is equipped with electro-magnets which are in alternation energized and de-energized by the making and breaking of contact, as the disk rotates, between block 1 and the strips 60 into which the plate of Fig. VI is cut. The gear wheel 80 is provided with the soft iron ring 12 movable in response to the opposed forces of spring tension and magnetism to opposite positions of release and connection between gear wheel 80 and disk 40.

I have described the invention in connection with measuring apparatus for volumetric measurement of liquid. Manifestly it is applicable to the volumetric measurement of compressible fluids (that is to say, of gas), if the compressible fluid measured be of such character, or if the measurement be effected under such conditions, that changes in degree of compression are non-existent, or are such as may be neglected.

Turning to the case where compressible fluids are measured by direct meters, that is by meters which require the filling and emptying of a constant volume, it is to be noted that the meter records only the volume unit passed, leaving the pressure to be determined; and a correction factor, based upon pressure, has to be applied, in order to determine the actual quantity of gas passed. The accuracy with which the pressure factor may be determined is dependent upon the type of meter used.

By experiment, the proper correction factor as a function of the pressure may for a direct meter of any particular type be determined, and, being determined, may be expressed concretely in the shaping of the plate 6 (60) of the instrument shown and described above, used in association with such direct meter.

Using as the bounding curve O—B of the plate 6 (60), the curve so calculated, instead of the square root curve described, it becomes possible to obtain, by the summation process described above, a correct pressure factor which, multiplied into the volume figure recorded by the direct meter during the same period, gives the true quantity of gas passed, and in the chosen volume units.

Generalizing from the specific cases described, it will be observed that, for the integration of any function of a variable whose value is represented by the position of a block 1 along a guideway, and using the rotating cylinder of Fig. I, the plate 6 may be formed of a sheet of brass or other suitable metal bent to place, the edge O—B of the plate having been so shaped that the length of the line A'—B' from the variable point A' perpendicular to the line O—A always is the desired function of the length of the line O—A'. It may indeed be that the edge O—B shall be so shaped that the line A' B' shall always equal the line O—A', and if such be the case, then the function of the variable will be the value of the variable multiplied by one and the integration will then be the integration of the value of the variable itself. This, manifestly, is a special case under the general and inclusive disclosure of this specification, and will be found exemplified in my companion application, filed November 21, 1928, Serial No. 320,865, and co-pending herewith.

If the revolving disk of Fig. IV be used, then the contact surface of plate 60 will extend in a plane. This plate, whatever be the function which is to be recorded, will in its shape be bounded by (1) the arcs of two circles (the smaller may, as in the instance described, be reduced to zero), corresponding to the maximum and minimum values of the variable and hence to the maximum and minimum locations of the block 1 from its zero position, (2) the portion of a radial line drawn between these arcs and taken as the line along which initial contact of block 1 is made, and (3) a curve determined by the fact that the vector angle of a point describing it measured from the initial radial line mentioned is equal to or proportional to the value of the function in question, corresponding to that of the variable which represents the distance of the point from the center of revolution (taken as the zero point).

It is manifest that in the case of either of the instruments of Figs. I and IV, the rotating cylinder or disk in association with the block 1 which moves in its guideway being situated conveniently near the pipe line in which the orifice is formed, the tally may be situated at a remote point conveniently accessible for observation; that the circuit which is made and broken by the rotation of the strip-bearing cylinder or disk adjacent the moving block 1 may operate a relay in another circuit; and that the other circuit in turn may effect the intermittent rotation of the gear wheels of the tally. In such case, the electromagnets 9, instead of being borne by the cylinder 4 or the disk 40, will be borne by another clock-rotated member, situated at a relatively remote point, and, with manifest adaptation, alternate energizing and deenergizing of the electro-magnets being controlled by the relay circuit, the clutch may be operated substantially in the manner described.

Other particular applications of the general idea of the summation of a function of a variable may be made as the cases rise.

I claim as my invention:

In apparatus for effecting summation of the value of a variable during successive intervals of time, a contact piece movable along a pathway in response to variation in the value of a variable, a continually rotating carrier in parallelism with whose surface the pathway of the contact piece extends, a succession of strips of conducting material borne upon and having their contacting faces raised slightly above the otherwise insulating surface of the carrier, the ratio of the aggregate extent of the strips to a complete circumference, along the line which in any given position the contact piece will describe upon the rotating carrier, being diverse from point to point, a tally, and means for driving the tally, the tally-driving means being responsive to an electric current in a circuit completed and interrupted by the contact piece in cooperation with the rotating carrier.

In testimony whereof I have hereunto set my hand.

ARCHER E. YOUNG.